United States Patent [19]

Sheldon

[11] 4,153,293
[45] May 8, 1979

[54] BACK REST
[75] Inventor: Samuel B. Sheldon, Marblehead, Mass.
[73] Assignee: Nepsco, Inc., Natick, Mass.
[21] Appl. No.: 830,386
[22] Filed: Sep. 6, 1977
[51] Int. Cl.$^2$ ............................................... A47C 7/46
[52] U.S. Cl. ..................................... 297/284; 297/460
[58] Field of Search ............... 297/284, 230, 231, 353, 297/460

[56] References Cited
U.S. PATENT DOCUMENTS

| | | | |
|---|---|---|---|
| 1,095,890 | 5/1914 | Knauer | 297/353 |
| 1,113,833 | 10/1914 | Ruff | 297/353 |
| 1,264,265 | 4/1918 | Brusius | 297/284 |
| 2,813,577 | 11/1957 | Weekly | 297/230 X |
| 2,843,195 | 7/1958 | Barvaeus | 297/284 |
| 2,942,651 | 6/1960 | Binding | 297/284 |
| 3,241,879 | 3/1966 | Castello | 297/284 |

FOREIGN PATENT DOCUMENTS 696110 10/1965 Italy ......................................... 297/284

Primary Examiner—Francis K. Zugel
Attorney, Agent, or Firm—Dike, Bronstein, Roberts, Cushman & Pfund

[57] ABSTRACT

A back rest constructed to be supported at its foot on a seat structure and to rest against the back of the seat structure comprising a rigid frame, a normally flat, flexible back support mounted on the frame with the lower end thereof stationary and the upper end movable and a screw rotatably mounted to the frame at the upper end operable to move the movable end of the flexible back support relative to the stationary end to bow the back support convexly forwardly with respect to the frame. Alternatively, an eccentric supported at the back side of a flexible back support in engagement therewith is used to effect bowing of the flexible back support. A bottom support pivotally connected at one end to the foot of the frame so as to extend forwardly from the foot across the seat provides for holding the foot of the frame against the back of the seat structure and a seat cover.

6 Claims, 8 Drawing Figures

BACK REST

BACKGROUND OF INVENTION

Back rests designed to relieve back strain, and, hence, fatigue are known, for example, such as that shown in U.S. Pat. No. 2,942,651. The back rest herein illustrated is considered to provide improvements in construction, comfort, and cost of manufacture over the structure disclosed in the aforesaid patent.

SUMMARY OF INVENTION

As herein illustrated, the back rest comprises a rigid frame adapted to be set upright on one end upon a seat structure so as to rest against the back of the seat structure, a normally flat, flexible back support mounted to the frame with one end stationary and the other end movable, and means on the frame for moving the movable end relative to the stationary end to cause the normally flat, flexible back support to bow convexly forwardly relative to the frame. The aforesaid means may be a screw connected to the movable end of the flexible back support or an eccentric mounted to the frame in engagement with the rear side of the flexible back support. There is means at the lower end or foot of the frame for adjusting the frame heightwise with respect to the bottom of the seat structure, and means intermediate the ends of the frame arranged to be disposed at an angle thereto to support the frame fowardly with respect to the back of the seat structure. There is means on the frame mounting the one end of the flexible back support member to the frame in stationary relation thereto and means on the frame mounting the other end of the flexible back support member to the frame for movement relative to the one end. The flexible back support member is removably secured by the aforesaid means and has on its front face a cushion member which is coextensive therewith. At the foot of the frame, there is a forwardly extending bottom support comprising a rectangular border wire flexibly connected at its rear edge to the foot of the frame and a web stretched in tension across the border wire.

The invention will now be described in greater detail with reference to the accompanying drawings, wherein:

FIG. 5 is a side elevation of an alternative means for moving the movable end of the flexible back support relative to the stationary end to bow the flexible back support forwardly;

FIG. 6 is a fragmentary elevation of alternative means for adjusting the back rest forwardly from the back of the seat; and FIG. 6A is a section taken in the line 6A-6A of FIG. 6.

Figures 1, 1A:
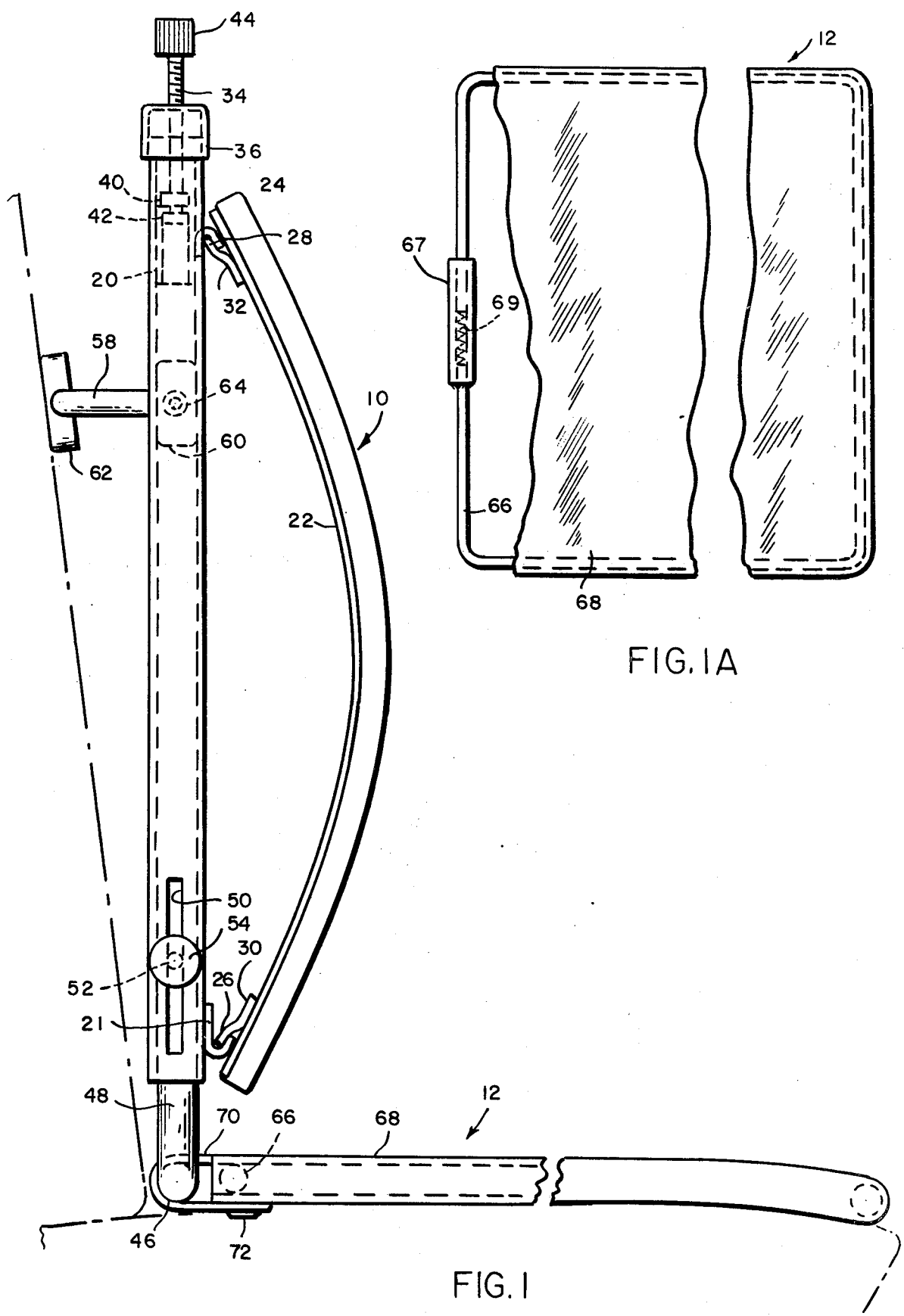
FIG. 1 is a side elevation of the back rest supported at its base on a seat structure in engagement with the back of the seat structure.
FIG. 1A is a plane view of the bottom support with portions broken away.

Referring to the drawings, FIG. 1, there is shown a combination back support 10 and bottom support 12 constructed to be disposed with the foot of the back rest and the bottom support 12 resting on the seat structure, for example, the front seat of an automobile and with the back support resting against the back of the seat structure.

Figure 2:
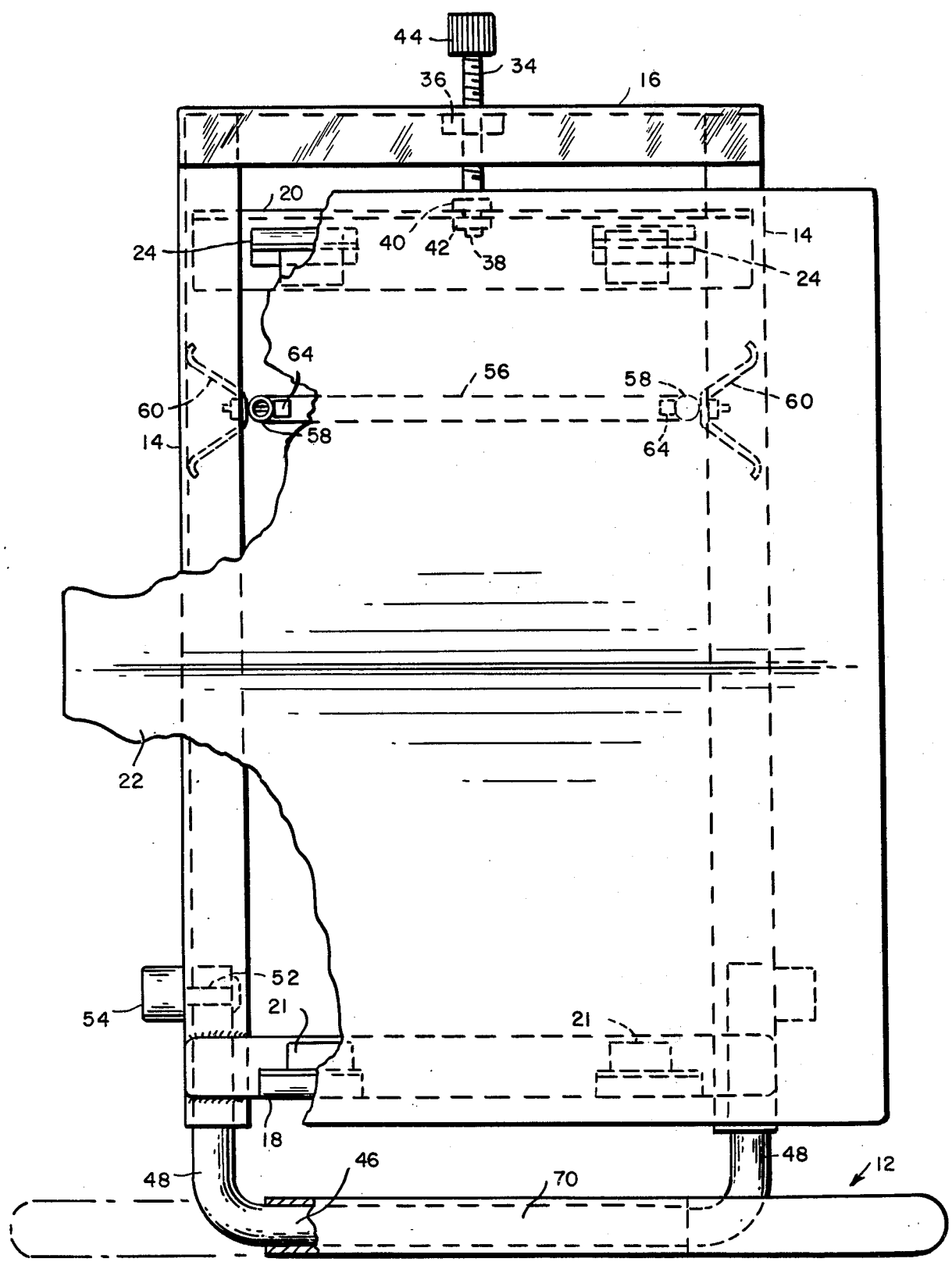
FIG. 2 is a front elevation of the back rest as seen from the right side of FIG. 1 with portions broken away.

The back support 10, FIG. 2, comprises a substantially rectangular frame comprising transversely spaced parallel facing channel members 14—14 and longitudinally spaced parallel end members 16 and 18 welded at their intersecting ends to form a rigidly stable structure. A bar 20 is mounted transversly of the frame with its ends slidably engaged within the channels defined by the facing channel members 14—14 at the upper end of the frame for movement relative to the upper end toward the lower end.

A normally flat, flexible back support member 22 of generally rectangular configuration is mounted to the frame on the end member 18 at the lower end of the frame and the bar 20 at the upper end of the frame by means of transversely spaced hook-shaped cleats 21—21 on the lower end member 18 and 24—24 on the bar 20 at the upper end of the frame facing each other for receiving the oppositely directed edges 26—26, 28—28 of transversely spaced cleats 30—30, 32—32 welded to the rear side of the back support member 22. The cleats may be formed out of the end members and back support member by die-cutting and displacing the metal from the plane of the parts.

As thus arranged, the lower end of the back support member is stationary with respect to the lower end of the frame and the upper end is movable relative to the lower member so as to bow the back support member convexly fowardly with respect to the frame. Movement of the upper end of the back support member is achieved as shown in FIGS. 1 and 2 by means of a screw bolt 34 threaded through a boss 36, FIG. 1, provided on the upper end member 16 with its end rotatably engaged within an opening 38 in the bar 20 by means of retaining washers 40 and 42. The bolt 34 is provided with a knurled knob 44 by means of which it may be rotated and, by such rotations, moves the bar 20 along the channel members 14—14 relative to the lower stationary end of the back support member.

Alternatively as shown in FIG. 5, eccentric means may be employed to effect forward bowing of the flexible back support. In this form, bar 20 is fixed and the bar 18 is provided with pins 17—17 at its end which extend through slots 19—19 which thus permit the bar to move upwardly and downwardly in the channels of the facing channel members 14—14 and a shaft 25 is mounted to the frame at the rear side of the flexible back support in slots 27—27 in the channel member 14—14. An eccentric 29 is fixed to the shaft 25 in engagement with the rear side of the flexible support member so that by rotation of the shaft, the eccentric will displace the flexible back support forwardly. There are knurled nuts 31—31 at the ends of the shaft which enable binding the ends of the shaft at a predetermined longitudinal position on the frame and fixing the eccentricity of the eccentric.

It is desirable to be able to elevate the back support relative to the seat upon which its foot rests, and accordingly, there is provided at the foot of the frame a part 46 of tubular construction bent at its ends to provide spaced, parallel legs 48—48 for sliding engagement within the channels of the facing channel members 14—14. The outer sides of the channel members 14—14 are provided with longitudinally extending slots 50—50, FIG. 1, for receiving the threaded ends of bolts 52—52 which extend through the legs 48—48 from their inner sides outwardly through the slots 50—50.

Knurled nuts 54—54 screwed onto the threaded ends of the bolts provide for fixing the part 46 at a predetermined position of adjustment.

It is also desirable to adjust the back support forwardly and rearwardly with respect to the back of the seat structure on which it is supported. Accordingly, there is provided a part 56 of tubular construction having bent spaced parallel ends 58—58 to which are pivotally connected spring slides 60—60 which are slidably engaged within the channels of the facing channel members 14—14 to thus enable movement of the part 56 relative to the upper and lower ends of the frame, and also to permit angular movement of the part 56 about an axis parallel to the frame to a position of angular relation to the frame. A pad 62 may be pivotally connected to the part 56 for engagement with the back of the seat structure. Desirably, binding screws 64—64 are used for attaching the arms 58—58 to the slides 60—60 to enable fixing the part 56 in predetermined longitudinal angular positions.

Alternatively, as shown in FIG. 6 and 6A, part 56 is of rectangular cross section, the arms 58—58 are pivotally connected to the channel member 14—14 by pivot pins 65—65 extending through slots 69—69 to permit vertical adjustment of the part 56. Collars 67—67 are slidably mounted on the arms 58—58. Upward tilting of the arms can thus be limited by binding of the collars against the channel members.

The bottom support 12 at the foot of the back rest comprises a rectangular wire frame comprised of a stiff wire 66 of circular cross section upon which is stretched an envelope 68 of web-like material as, for example, a woven canvas material which is relatively resistant to stretch. To retain the envelope on the wire frame, the rear side of the wire frame is split and the split ends held spread apart by means of a sleeve 67 welded to one of the ends and a spring 69 seated within the sleeve with its end abutting the other end of the split frame, as shown in FIG. 1A.

The bottom support is fastened to the foot of the frame of the support by means of a flexible lap of webbing 70 extending from the upper side of the envelope rearwardly about the part 46 and mutually interengageable snap fasteners 72—72 at the distal end of the lap and on the underside of the envelope. The bottom support, while completely flexible with respect to the back support provides, when a person occupies the seat, means for holding the foot of the back support against the back of the seat.

Figure 3:
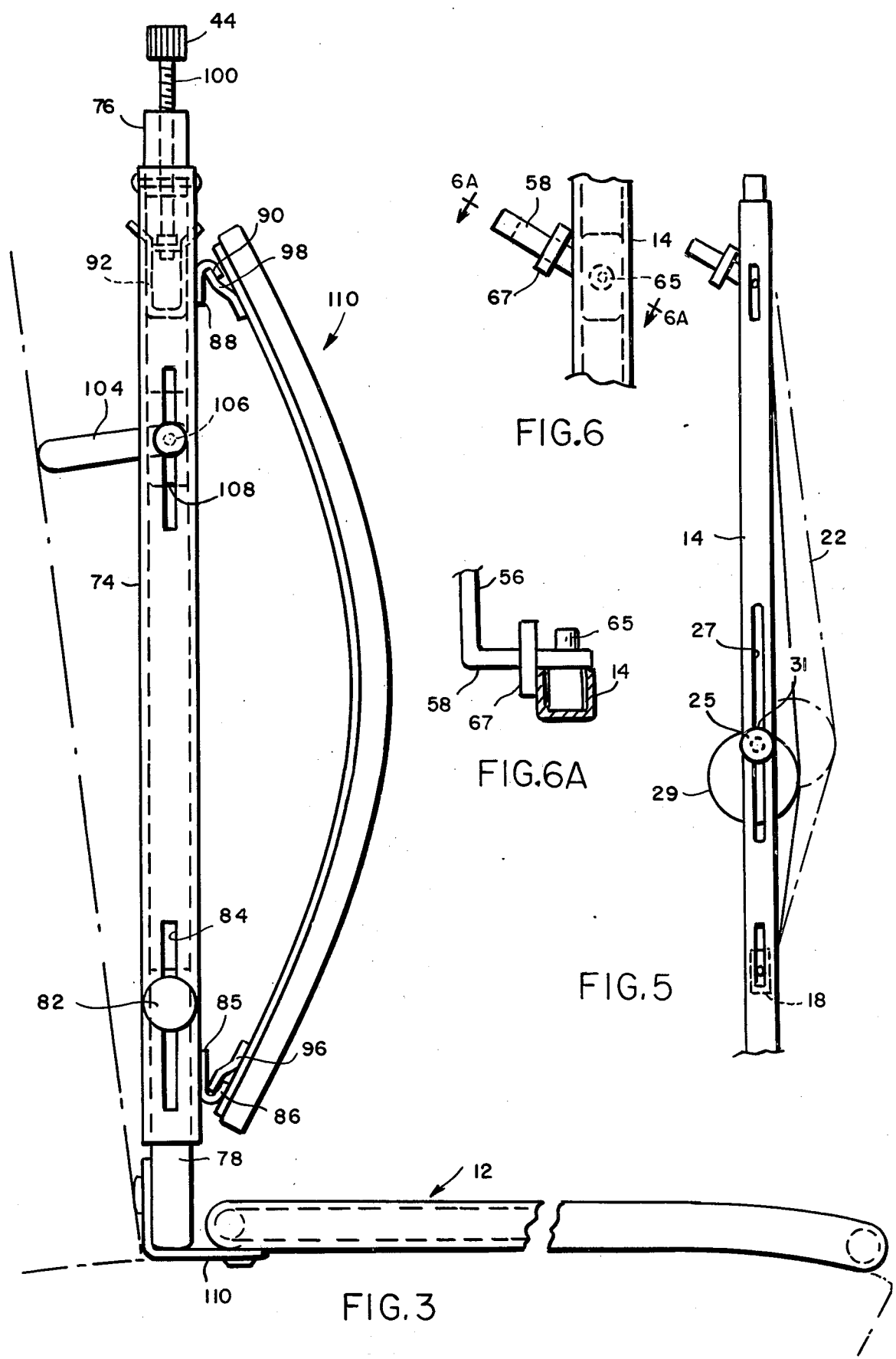
FIG. 3 is a side elevation of an alternative form of the structure.
Figure 4:
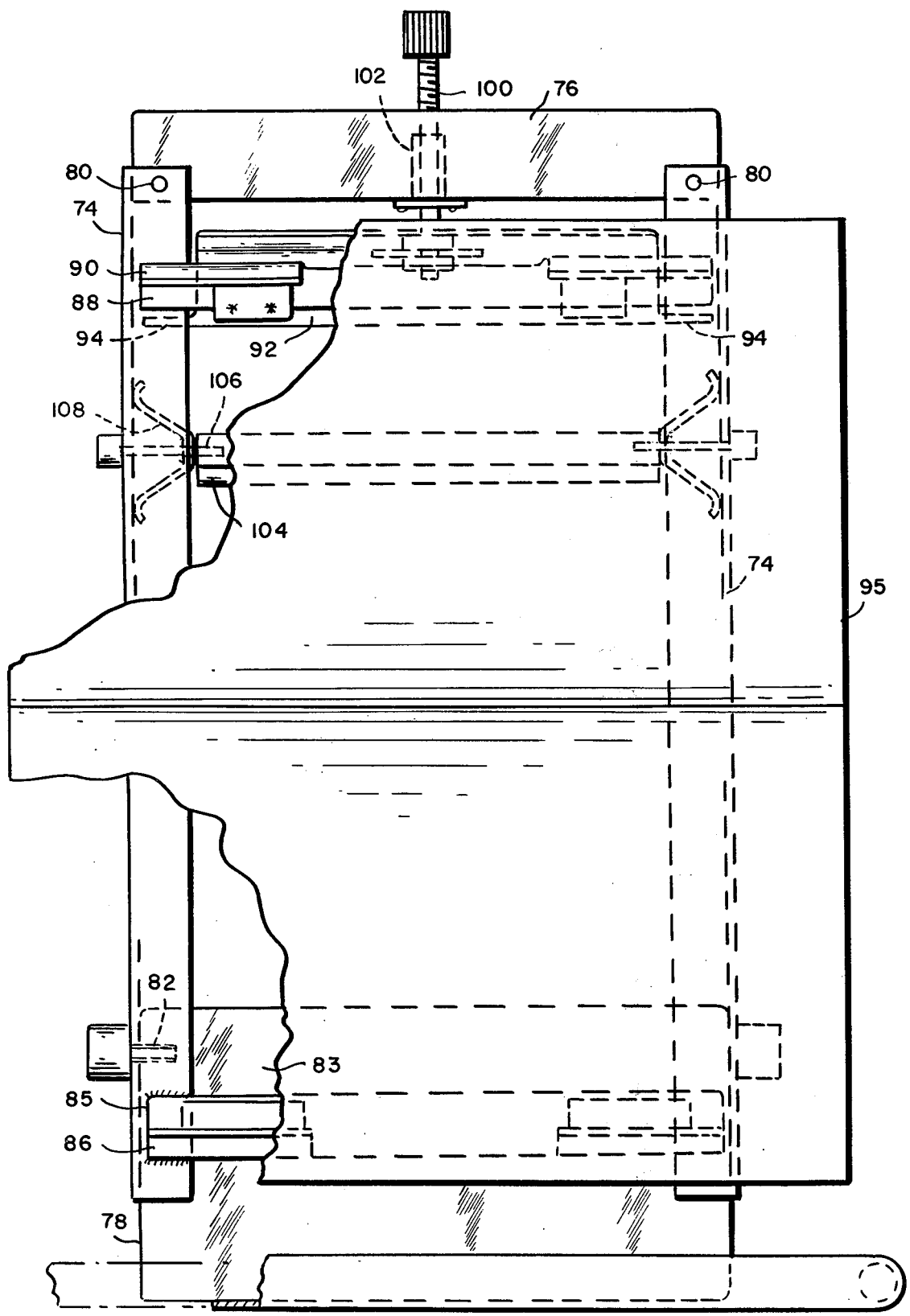
FIG. 4 is a front elevation of FIG. 3.

Alternatively, as shown in FIGS. 3 and 4, the frame may comprise spaced, parallel facing channel members 74—74 rigidly joined at their upper and lower ends by spaced, parallel end members 76,78. In this form, the members 76,78 are comprised of wood rather than metal and their opposite ends are fastened within the channels defined by the facing channel-shaped side members 74—74 at the upper end by bolts 80 which fix the upper member 76 with reference to the side members and the lower member 78 by means of thumbscrews 82 which extends through slots 84, FIG. 3, in the side members and are screwed into the ends of the member 78 which thus enables adjusting the position of the member 78 relative to the member 76 so as to extend the overall length of the frame from top to bottom and thereby to adjust the frame heightwise of the bottom of the seat structure. The wood top and bottom members 76 and 78 afford an opportunity for providing a somewhat more tailored finish than is possible with a metal structure.

A part 83 is welded at its opposite ends to the forward sides of the channel members 74—74 which has along its lower edge a bent strip 85 having an upwardly projecting lip 86. At the upper end of the frame, there is a corresponding strip 88 having a downwardly projecting lip 90. This strip is welded to a bar 92, the opposite end portions 94—94 of which are slidably engaged within the facing channels of the side memers 74—74 so that it can be moved relative to the end members.

The back rest support, as previously described, comprises a normally flat, flexible rectangular plate 95 which has at the rear side of its upper and lower ends rearwardly diverging cleats 96,98 for engagement, respectively, with the lips 86,90 to support the back rest on the frame. As thus constructed, the lower end of the back rest support is held stationary with respect to the frame and the upper end is movable relative to the end members. Movement of the upper end of the back rest support is achieved by movement of the bar 92 and, for this purpose, there is provided a screw 100 threaded through a bushing 102 set into the end member 76 and rotatably connected to the bar 92. Rotation of the screw will thus move the bar 92 and, hence, the upper end of the back rest support toward the lower end so as to bow it convexly forwardly as shown in FIG. 3. Alternatively, as shown in FIG. 5, an eccentric may be substituted for the screw 100.

In order to adjust the angle of the back rest support relative to the back of the seat structure, there is provided a transversely mounted bar 104, the ends of which are pivotally connected by means of screw bolts (pins) 106—106 to spring sliders 108—108 movable along the side members. The bar 104 is pivotally movable about the axis of the screw bolts 106—106 rearwardly with respect to the frame so as to dispose its distal end behind the frame at a predetermined angle in engagement with the back of the seat structure. The angular disposition of the bar 104 may be fixed by the screw bolts (a suitable thumbscrew arrangement such) as shown in FIG. 3. As described with respect to the back rest shown in FIGS. 1 and 2, the back rest support member is provided with a cushion pad 109 of suitable material such as sponge rubber. The bottom support corresponds to that shown in FIGS. 1 and 2 and so need not be again described, except to point out that since the lower end member 78 is not tubular, straps 110—110 are snap-fastened at one end to the rear edge of the bottom support and at their other ends to the rear side of the lower end member 78.

It should be understood that the present disclosure is for the purpose of illustration only and includes all modifications or improvements which fall within the scope of the appended claims.

I claim

1. A back rest comprising a rigid frame adapted to be set upright on one end upon the bottom of a seat structure so as to rest against the back of the seat, a normally flat, flexible back support, means mounting the back support on the frame with one end stationary and the other end movable, means on the frame for moving the movable end relative to the stationary end to cause the normally flat, flexible back support to bow convexly forward relative to the frame and means for supporting the frame at different angular positions relative to the back of the seat, said frame comprising transversely-spaced parallel side members of channel-shaped section, a top member of channel-shaped section extending transversely of the side members within which the ends of the side members are received, said top member having closures at its ends, a U-shaped bottom member of right circular section extending transversely of the side members, said U-shaped bottom member having a horizontal portion parallel to the top member and transversely-spaced vertical parts perpendicular thereto telescopically engaged within the lower end of the side members, with the horizontal portion spaced downwardly from the ends of the side members, said top member being welded to the side members, and means adjustably fixing the vertical portions of the U-shaped bottom member to the side members, the means mounting the flexible back support to the frame comprising a bar of channel shape mounted at the top of the frame between the side members with its ends slidably engaged within the channels of the side members in parallel relation to the top member, a bar mounted at the bottom of the frame to the side members with its ends welded to said side members in parallel relation to the bottom member, transversely-spaced hooks fixed to the respective top and bottom bars mounted with their bent ends facing, said flexible back support comprising a flexible panel and means fixed to the opposite ends of the panel, said means extending in opposite directions into engagement with the said hooks, and said means for adjusting the convexity of the back support comprising a screw threaded into the top member provided at one end with a part rotatably engaged with the top bar and at its other end a knob by means of which it may be rotated to move the top bar relative to the bottom bar to thereby change the convexity of the back, said means for supporting the frame at different angular positions comprising side members slidingly engaged within the channels of the side members, a U-shaped rod mounted transversely in the slide members at the rear side of the frame with its ends pivotally connected to the slide members for rotation about a horizontal axis parallel to the top member to dispose it at an angle to the frame and means for fixing the slide members at a predetermined position in said side members.

2. A back rest according to claim 1 wherein a cushion member is fixed to and coextensive with the forward face of the back support member.

3. A back rest according to claim 1 comprising means at the foot of the frame engaging with the bottom of the seat structure for holding the foot of the frame in engagement with the back of the seat structure.

4. A back rest according to claim 3 wherein said means comprises a bottom support member flexibly connected at one end to the foot of the frame and extending forwardly therefrom across the bottom of the seat structure.

5. A back rest according to claim 3 wherein said bottom support member comprises a rigid, substantially rectangular wire frame and web stretched upon the wire frame.

6. A back rest according to claim 3 wherein the wire frame is split at the rear side and yieldably expanded by spring means disposed between the split ends to thus stretch the web transversely between the sides of the frame.

* * * * *